(12) United States Patent
Callahan

(10) Patent No.: US 10,783,578 B1
(45) Date of Patent: Sep. 22, 2020

(54) COMPUTERIZED SYSTEMS AND METHODS FOR DETECTING, RISK SCORING AND AUTOMATICALLY ASSIGNING FOLLOW-ON ACTION CODES TO RESOLVE VIOLATIONS OF REPRESENTATION AND WARRANTIES FOUND IN LOAN SERVICING CONTRACTS, LOAN PURCHASE AND SALE CONTRACTS, AND LOAN FINANCING CONTRACTS

(71) Applicant: James Callahan, Greenwich, CT (US)

(72) Inventor: James Callahan, Greenwich, CT (US)

(73) Assignee: James Callahan, Greenwich, CT (US)

( * ) Notice: Subject to any disclaimer, the term of this patent is extended or adjusted under 35 U.S.C. 154(b) by 703 days.

(21) Appl. No.: 14/985,924

(22) Filed: Dec. 31, 2015

Related U.S. Application Data

(60) Provisional application No. 62/098,689, filed on Dec. 31, 2014.

(51) Int. Cl.
*G06Q 40/00* (2012.01)
*G06Q 40/02* (2012.01)

(52) U.S. Cl.
CPC .................. *G06Q 40/025* (2013.01)

(58) Field of Classification Search
CPC .................................. G06Q 40/025
See application file for complete search history.

(56) References Cited

U.S. PATENT DOCUMENTS

| | | | | |
|---|---|---|---|---|
| 6,094,643 A | * | 7/2000 | Anderson | G06Q 20/04 235/379 |
| 6,233,566 B1 | * | 5/2001 | Levine | G06Q 40/02 705/36 R |
| 7,689,503 B2 | * | 3/2010 | Halper | G06Q 20/042 705/35 |
| 2001/0047326 A1 | * | 11/2001 | Broadbent | G06Q 10/10 705/38 |
| 2001/0056398 A1 | * | 12/2001 | Scheirer | G06Q 40/02 705/38 |
| 2002/0019804 A1 | * | 2/2002 | Sutton | G06Q 20/10 705/38 |
| 2003/0023544 A1 | * | 1/2003 | Chodes | G06Q 10/10 705/38 |
| 2003/0229581 A1 | * | 12/2003 | Green | G06Q 10/10 705/38 |
| 2008/0114715 A1 | * | 5/2008 | Palaniappan | G06N 5/02 706/60 |

(Continued)

OTHER PUBLICATIONS

Z. Zhang, "Research of Default Risk of Commercial Bank's Personal Loan Based on Rough Sets and Neural Network," 2011 3rd International Workshop on Intelligent Systems and Applications, Wuhan, 2011, pp. 1-4, doi: 10.1109/ISA.2011.5873366. (Year: 2011).*

*Primary Examiner* — Rajesh Khattar
(74) *Attorney, Agent, or Firm* — K&L Gates LLP

(57) ABSTRACT

Computerized systems and methods (1) detect an item (e.g., loan or practice) within a securitization trust or other financing vehicle that may fall below the standards outlined by representations and warranties made by the securitization trust, and (2) automatically export reports to other systems so such other systems can systematically analyze the identified item, which may then be possibly used to remedy the item.

13 Claims, 4 Drawing Sheets

(56) References Cited

U.S. PATENT DOCUMENTS

| | | | |
|---|---|---|---|
| 2010/0131426 A1* | 5/2010 | Kroutik | G06Q 30/00 705/36 R |
| 2011/0238548 A1* | 9/2011 | de Jonge | G06Q 40/00 705/35 |
| 2012/0246060 A1* | 9/2012 | Conyack, Jr. | G06Q 40/02 705/38 |
| 2014/0089168 A1* | 3/2014 | Metz-Galloway | G06Q 30/018 705/38 |
| 2015/0339769 A1* | 11/2015 | deOliveira | G06Q 40/025 705/38 |

* cited by examiner

COMPUTERIZED SYSTEMS AND METHODS FOR DETECTING, RISK SCORING AND AUTOMATICALLY ASSIGNING FOLLOW-ON ACTION CODES TO RESOLVE VIOLATIONS OF REPRESENTATION AND WARRANTIES FOUND IN LOAN SERVICING CONTRACTS, LOAN PURCHASE AND SALE CONTRACTS, AND LOAN FINANCING CONTRACTS

PRIORITY CLAIM

The present application claims priority to, and incorporates by reference in its entirety, U.S. provisional patent application Ser. No. 62/098,689, filed Dec. 31, 2014.

BACKGROUND

When parties finance their loan investments they tend to finance them using direct financing agreements with banking-like institutions or loan securitizations where bonds are sold to third party investors. For purposes of this application, the direct or securitization financings are generally considered being the same. The scale of finance industry flaws found in loan securitization trusts that sparked the Great Recession in the U.S. circa 2007-2008 was massive. As a generalization, the damage can be attributed to three macro items:
  (i) "bad loans" being placed in or pledged to loan securitization trusts that were in violation of the standard of care outlined in the loan representations and warranties ("Reps") section of the (a.) purchase and sale contract, (b.) securitization trust's documents, or (c.) other conveyance and financing related documents;
  (ii) "bad collections" operations that were not performed to the same standard of care outlined in the servicing Reps that were described in the applicable offering and related documents; and
  (iii) a failure for a party to remedy the situation. Upon review, no party proactively sought to remedy the damaged items. The expected party consistently failed to pursue remedies for violations of these items, even though the documents often included detailed remedies to detect and address cures for possible flaws.
Evidence has shown that in many cases, no party was proactively and consistently analyzing each loan's origination and collections features to identify possible flaws relative to the represented standard and no party was proactively seeking damages reimbursement to the trust on behalf of its investors. Some of the pools had over 10,000 loans per trust, and some institutional investors relied on the operator's representations so they did not have to undertake costly loan-by-loan due diligence efforts prior to buying the loans. These representations were provided on trillions and trillions of dollars of loans. In fact, this was a massive failure and lawsuits cumulatively totaling well over 0.5 Trillion have been observed. To this date, virtually none of the original parties of the old trusts have agreed to provide this suite of rep policing functions going function.

Investors believed that some party was consistently and proactively acting like an owner representative to maximize the value of the collateral pool when a Rep violation was identified, but there often was no such party. Indeed, "failing to investigate" and "failing to act" were frequent criticisms. It has since been found that an overwhelming majority of market-leading regulated banking institutions failed to apply the same quality control policies and procedures that they used to manage their own book of loans when those same institutions were performing similar duties for loan securitization trusts and other financing and transfer vehicles. This is believed to be due in part to structural nuances found in securitization trusts. These include certain off balance sheet accounting protocols, imbedded conflicts between one or more affiliates and/or trust parties, poorly worded representations in the transaction documents that made them virtually impossible to decide compliance, concerns for litigation exposures from parties in and out of the trust if they made unpopular compliance determinations, and compliance with law concern (such as REMIC provisions), just to name few. Intentionally or not, the maze of competing rules and self-interests within the trust organization effectively resulted in "brain-dead" securitization trusts. If bad loans or bad operating practices were incorporated in the trusts, it was virtually impossible to detect and fix them on a consistent and timely basis, even though the transaction documents suggested otherwise.

SUMMARY

In one general aspect, this invention can resolve the brain dead problems found in the 10+ Trillion dollar mortgage market through (i) automatic and consistent analytical detection of Rep breaches, (ii) risk scoring of those breaches to identify which violations are material or minor, and (iii) follow-on action coding to assure a remedy is undertaken, thereby solving the "failure to investigate" and "failure to act" problems that fueled the Great Recession. The present invention can be used to periodically and consistently analyze hundreds of data elements on hundreds of thousands of loans to identify if a Rep imbedded in a trust is flawed. Humans by themselves cannot be expected to do this consistently on scale, so this invention replaces the current techniques, which involve human detection, with a growing pool of detection scripts to identify possible Rep violations. Consistency in approach is extremely important. The present invention can systematically hunt for potential Rep violations in collateral pools by applying multi-layered, pre-established data filters to data related to the trust's collateral and operations, and, when a potential violation is detected, sends notification to one or more investigating parties to analyze each possible violation based on the level of concern commensurate with the identified facts in relation to the breached Rep type. Once referred to that investigator, that investigating party can determine if the Rep was actually breached and, if so, quantify damages and work with authorized parties to settle up for the violation. Importantly, aspects of this invention go to the core of the "failure to act" problem found in old subprime deals by systematically identifying the potentially breached Reps. Had this been applied previously, the massive destruction created by the sub prime crisis could possibly have been diverted or reduced, since this invention can provide a fast early warning and invaluable remediation tool through, in various embodiments, assigning each loan that fails a detection filter both a Risk of loss Score and a follow on Action Score.

In various embodiments, the present invention is directed to computerized systems and methods that (1) detect an item (e.g., a loan feature or operating practice) that may fall below the standards committed to in each Rep, (2) automatically score the identified item based on the amount of potential loss, in one instance, (3) assign a research priority or follow-on action code to the item, and then (4) export reports to other systems so such other systems can systematically analyze the identified item as per the risk coding, which may then be possibly used to remedy the item. Once the system is set up with multivariate detection scripts (or filters) related to each type of Rep, the system looks for loans and or operating practices shortcomings using such specialized filters. The system may automatically and periodically apply the various rep and warranty violation detection filters stored in a detection filter database to the loans. Loans and operating practices that fail to meet the filter criteria can be flagged for review. By applying the filters programmatically, the system ensures that the filters are applied according to a consistent protocol. The filters can be different for different types of loans or operations, and the filters can be developed from numerous sources, including: past and ongoing investor lawsuits alleging trust rep and warranty breaches; institutional knowledge about problematic loan characteristics; changes in the law and industry practices; and machine learnings to identify characteristics of loans that correlate to likely rep and warranty breaches. The system can develop more telling filters in such a machine-learning mechanism when it monitors larger numbers of loans and pools. Accordingly, computer implementation is needed to review the massive number of loans in a periodic (e.g., monthly) manner. As an example, looking at the patterns on how a borrower pays a loan over a period of time can be a very helpful tool to flag a possible Rep flaw. For instance loans that go delinquent soon after the loan has been origination may be flagged, assigned a high risk score of loss and prioritized and assigned as a top loan to review. Alternatively, a loan that consistently does not pay on time in January (possibly due to holiday shopping) and has always caught up in February for the past 10 years of the loan's life may be flagged but assigned a lower default risk code and a low follow-on action code. Staff availability (in terms of amount and their grades of capability) can be entered into the system and the assignments can be made based on staffing resources. Action codes could be allocated based on available staffing resources in some instances.

Each detection filter can be programmed to have a corresponding risk score and/or follow-on action prioritization. Such risk scores and follow-on action steps can be modified over time as the user experience "learns." In some instances, a detection filter could develop a lot of false positives. To respond, the corresponding risk score for that filter could be reduced in the future to compensate for such false positives. It is expected that the library of detection scripts will only grow over time but the risk scoring may effectively off set the need to aggressively or secondarily investigate such. Collectively, these detection and associated action prioritization steps address investor concerns that "no one was consistently watching and no one was consistently investigating" to the required level of care.

Accordingly, with the present invention, if a party wishes to improve their confidence in the rep and warranty enforcement regime, that party can assign a third party to incorporate the specialized systems of the present invention into their work flows to help them consistently detect items that fall below the standards outlined in the trust's Reps and initiate follow on actions to analyze such identified items and remedy them where applicable. Over the passage of time, the number of cases generated by this system will improve its predictive capabilities. As each review case is closed out, a researcher will observe the list of "hits and dead ends" and can adjust the risk scoring and the action prioritization codes. Features that are identified as likely to increase loss frequency or loss severity can then be further analyzed for financial impact to the pool of assets. High frequency but low-loss items may receive less follow-on analyst work as opposed to low frequency/large-loss items. There can be millions of detection filters with strings of conditional features.

In addition to providing a fast and consistent work engine for this highly complex matter, the output from this invention can be an invaluable confidence-builder to senior compliance officers before he/she makes any personal attestation to his/her stakeholders and regulators about the loan quality and operating practices. Without this invention, there is no way for him/her to really know if defendable monitoring and remediation are occurring as needed on this massive scale. Regulators require very high standards of oversight by financial institutions and this is the only mechanism known to the inventor to provide such protection in the loan rep and warranty field.

FIGURES

Various embodiments of the present invention are described herein by way of example in conjunction with the following figures, wherein.

DESCRIPTION

Figure 1:
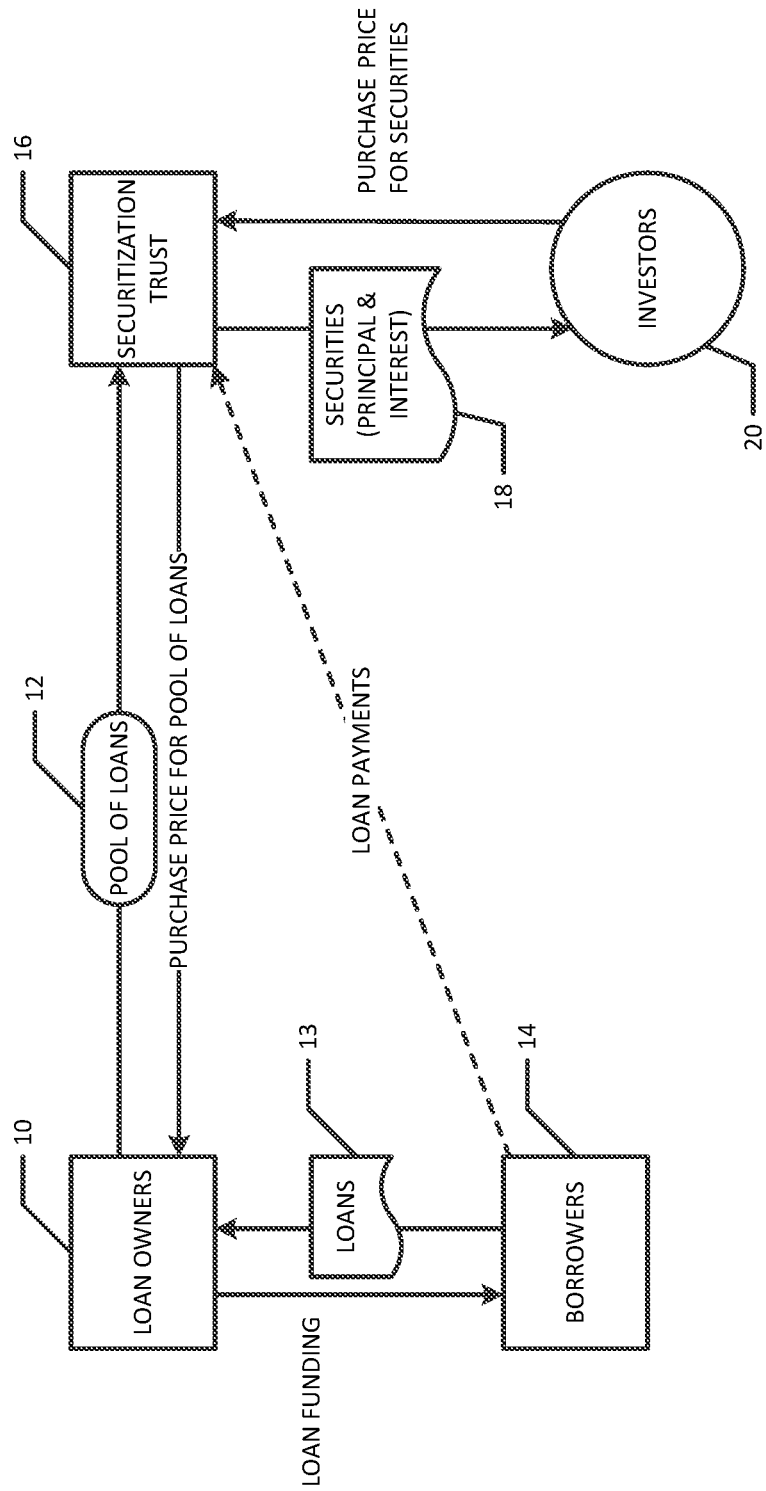
FIG. 1 is a block diagram illustrating a typical securitization structure.

As a remedy to the massive problems and issues with past securitization trusts described above, with embodiments of the present invention, future securitization trusts could engage (through their financing transaction documents) a third party upfront to use this invention's robust computer-implemented mechanisms to undertake a minimum level of care to perform systematic Rep compliance testing and initiate investigations that can result in remediation where necessary for securitizations or other financing transactions. At the time of setting up each new securitization, the invention's Rep-violation detection system could incorporate a built-in inventory of flawed-rep detection and auto-analysis protocols (e.g., filters or scripts) that could be relied upon to methodically initiate remediation activities in an automated and consistent fashion. As laws change or unique economic patterns evolve in the future, a specialty research analyst could modify the existing detection scripts, add new detection scripts, and reweight the risk and action coding. Whether the trust has 100 loans or a million loans, the testing and associated "need to act" follow-on action steps can therefore be automated. In various embodiments, the invention can also employ artificial intelligence or machine learning to generate more robust and intelligent rep and warranty compliance testing scripts and follow on remediation policies and procedures. Further, the Rep-violation detecting involved with the present invention can grow in sophistication as more and more loans are processed through it and ongoing research and revised coding is implemented. If "bad" loans or "bad" operating practices were identified in this manner with the present invention, they could be remedied effectively through the use of agreed upon rep testing procedures without fear of conflict, contract violation, or other delicate matters sometimes found in securitization trusts because this invention's detections and resolution mechanisms were described in the deal documents at the outset. Effectively, this tool would create a virtual "brain" for the trust related to Rep compliance monitoring and remediating matters. In addition to employing ever more insightful and proactive filters and scripts through the release of periodic updates, this invention can also provide users with tools to expand the group of detection scripts as the user identifies their own new concerning items and adds their own proprietary set of new detection filters that they believe are helpful. Additionally, this invention could also be used to improve reporting as the outstanding inventory of the invention's open detection and remediation cases for a specific trust could be referenced in periodic investor reports.

In various embodiments, the combination of this invention's detection/analysis engine (that is constantly monitoring various features of the trust that are suspected of violating Reps using the detection scripts and generating "need to act" notification to the user's analysts who may (or may not) then use agreed-upon testing procedures and economic damages estimating tools to repair breaches) will likely boost investor confidence that the securitization trust is being systematically monitored and expeditiously repaired of any flaws. Greater bond cash flow performance will generate investor confidence, which will result in higher bond prices and possibly lower lending coupons, which could result in more securitization trust financing volumes. Had these auto detection and analysis prioritization tool been used in the prior securitization trusts, the damages from the subprime disaster would likely have been many billions of dollars lower. Rating downgrades would have been earlier and possibly reduced in magnitude. Further, the following impact on the world economy would have been reduced. Instead, no one was consistently monitoring those securitizations for possible flaws and no one was assigned to fix the flaws that were detected. In some regards, this is a virtual trustee. Embodiments of this invention provide minimum standards of care related to proper compliance to agreed upon quality and standards as well as general trust governance. In one implementation, a software package contains a core set of filters. A party responsible for reviewing a trust's loans and practices can use that core-filter-set software package, and additionally add their own filters to the system. In addition to using the functionality of the systems described herein, the reviewing party could also perform their own non-computerized reviews.

Over the passage of time, the ongoing circular loop of information learned from similar trusts and collateral pools could create substantial improvement to the initial detection filters and associated action directives. Further, it is expected that public search engines will grow in sophistication, availability, and breadth in the future. The filters could incorporate data found in the public information that such search engines uncover and when combined with the information of the trust that is generated over the course of the trust's life, this invention could generate even more robust filters that detect possible rep and warranty violations. When using such, the sophistication of the invention could identify even more operational flaws and other matters. Also, this improving public information data set could help validate that a rep is not violated and instead that a simple change in circumstances for the borrower or operator in a trust caused bond cash flow performance to change, since not every loan default or missed payment corresponds to a Rep violation. Proving the positive or proving the negative can be very helpful in their own right.

Before explaining more details about the present invention, and overview of a common securitization structure is given in conjunction with FIG. 1. A loan owner 10, typically a bank, owns a pool of loans 12 that are loans to borrowers 14. The loans may be, for example, auto loans, credit card obligations, equipment loans, student loans, residential mortgages, commercial mortgages, etc. It should be noted that the loan owner 10 need not have originated the loans 13 to the borrowers 14, but might have acquired some or all of the loans 13 after origination. To securitize the loans 13, the loan owner 10 aggregates the loans 13 into the pool of loans 12, and sells or otherwise transfers rights in the pool of loans 12 to a securitization trust 16, that issues financial securities 18, typically bonds or other types of debt instruments, to investors 20. The securitization trust 16 uses the proceeds from the purchase of the securities 18 by the investors 20 to pay the loan owner 10 for the pool of loans 12. The securities 18 entitle the holders thereof, i.e., the investors 20, to principal and interest (and possibly other consideration) that are backed by the payments from the borrowers 14 on the underlying loans in the pool 12. As such, on an ongoing basis after issuance of the securities 18, as shown by the dotted lines in FIG. 1, the (typically periodic) loan payments by the borrowers 14 under the loans 13 are pledged to the securitization trust 16, which uses those payments to pay the principal and/or interest on the securities 18 to the investors 20.

Failure of the borrowers 14 to make their loan payments impairs the securitization trust's ability to make the principal and interest payment on the securities 18 to the investors 20. To facilitate bond investments (at high prices and at the fastest speed), due diligence by investors, rating agencies, and others when a new securitization is offered is common. Additionally, the trust 16 will offer certain Reps in its offering documents as an aid to investors so they do not need to perform a complete set of their own costly and time-consuming upfront due diligence. If it is found later that the Reps made by the trust (issuer) 16 were inconsistent with various features of the trust, it is common that there are previously agreed upon remedies found in the governing documents. Aspects of the present invention are directed to computer-based systems and methods to detect (or identify) loans or operational practices in a pool (or multiple pools) that might breach one or more of the securitization trust's Reps for the loan pool. Aspects of the present invention can also score the loan flaws or operational flaws, where the scores indicate recommended actions that should be taken with respect to the identified loans or by the trust. That action may be, for example, to have another party analyze the loans to determine if its features are inconsistent with (breach) a Rep or to monitor the situation, or other appropriate actions. In various embodiments, many different action codes can be programmed (e.g., 5 or 10 or more), depending on the nature of the violated script/filter and the resource pool of follow-on analysts to investigate such. That is, for example, each filter/script can map to one or more action codes, and when a loan or operational process satisfies the filter/script criteria, the mapped-to action code(s) is assigned to the item The number and nature of the Reps can differ depending on the type of loans aggregated in the pool (e.g., auto, mortgage, etc.), as well as the operational practices of the trust and/or the loan owner, etc. Generally, the Reps will include representations about the origination of the assets, the servicing of the assets, and general operations of the trust. For example, the trust's reps and warranties in various circumstances may relate to how the loan originator followed its own (or a third party's) origination procedures (or industry standards) as it undertook in-house workflows to analyze:

The borrowers' and any guarantors' qualification to repay the subject loan plus interest;

The pledged collateral features and tools to perfect an interest in such collateral;

The lender's (loan owner's) credit analysis and approval process;

The loan closing and post-closing practices;

Loan servicing collection matters up until purchase or over the life of the loan (which could pre-date the purchase of the loans by the trust 16);

Loan detail representations; and

Financing transaction features.

The Rep and Warranty reviewing party, using the computerized system of the present invention, automatically reviews data about the loans and operational practices of a trust (and/or any other assets) on a periodic basis to identify or detect loans and practices (such as a loan payment pattern) that suggests a possible breach of one (or more) of the Reps. The system can be run hourly, daily, weekly, etc. Once detected, follow-on recommended actions can also be suggested for the identified detection script type. For example, in some cases an authorized party (or multiple authorized third parties, as the case may be) may investigate whether the trust rep or warranty was breached and, where appropriate, pursue damages reimbursement or other resolution or remedies for the investors'/lender's behalf. Depending on the nature of the Rep violated, the remedy could be sought against the loan originator, the securities issuer (e.g., the trust), the loan servicers, or other parties associated with the trust, such as the trustee. In other cases, the recommended action may be to monitor the identified loans over a future period of time, and take appropriate action where needed, because a potential Rep breach may be looming.

Figure 2:
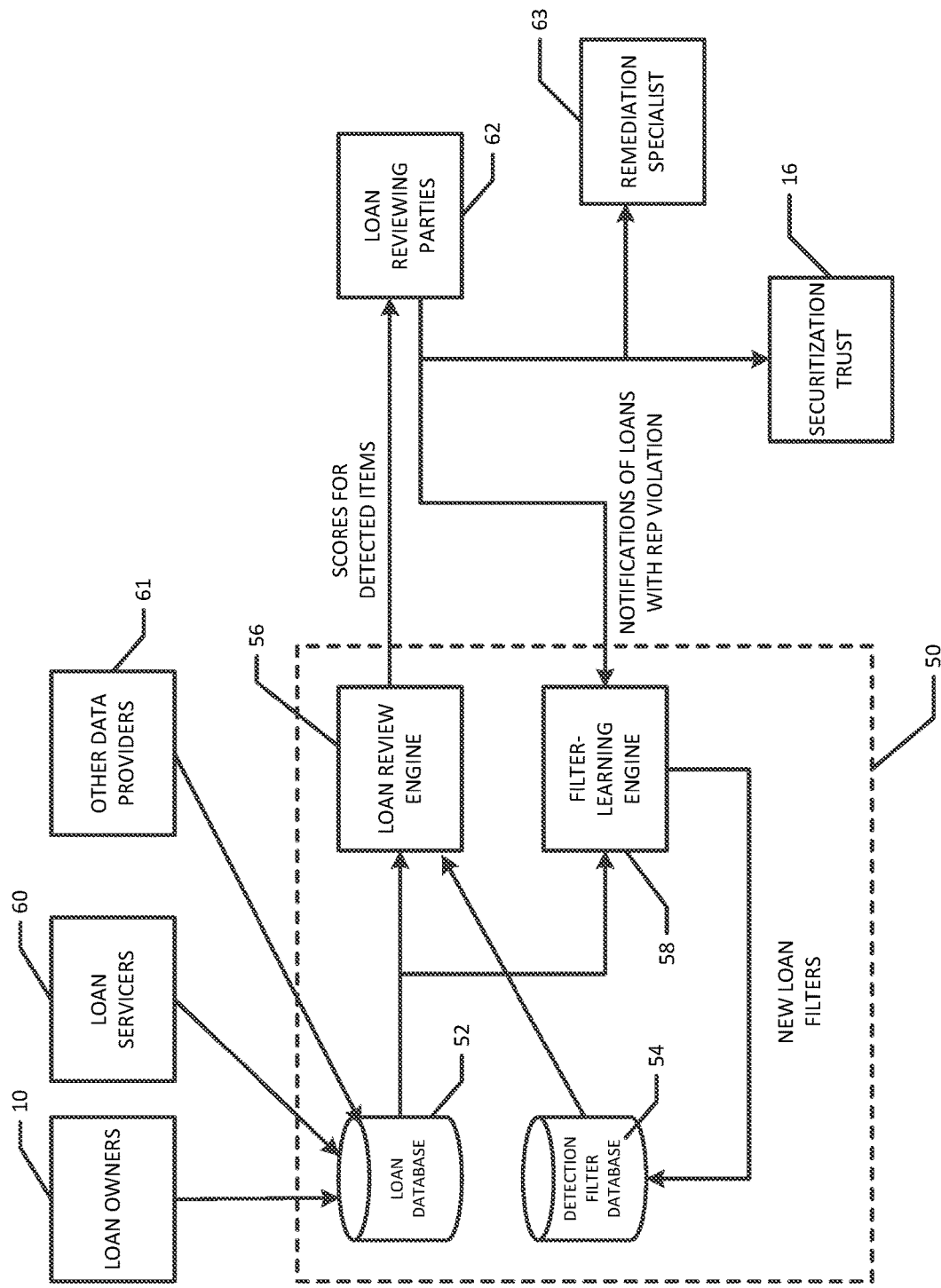
FIG. 2 illustrates a the loan-filtering computer system structure according to various embodiments of the present invention.

FIG. 2 illustrates a computerized system 50 that automatically and periodically reviews the loans and various operational practices in a securitization pool. The system 50 can review the items in one securitization pool or multiple securitization pools. The system 50 may be administered by a party separate and independent from the trust holding the pool of loans 16 and the loan owners 10, such as a bond trustee or another loan-reviewing party such as a fiduciary (or designee). For that reason, the party administering the system 50 is sometimes referred to herein as an "advocate," implying advocacy for the investors/lenders 20. As described herein, the system 50 can develop new filters based on learned attributes of loans that resulted in breaches of the trust's Reps, so that the system can develop smarter, more robust filters when it has loan data for more loans, and hence multiple securitization pools. Indeed, the system can review loans from one or numerous trusts and loan owners 10 (see FIG. 1). Over time, economic, regulatory and/or industry items may change that result in the system detecting and prioritizing certain loans that consistently fail to generate any recovery of funds for the trust. As such, while the filters will continue to be run each period, the risk and follow on action codes may be dropped in priority so more high-value targets can get full analysis/remediation attention. Since not every advocate has an unlimited army of analysts to look at every item, the system 50 may be modified to adjust to the available pool of detection analysts.

As shown in FIG. 2, the system 50 includes at least two computer databases: a "loan" database 52 and a detection filter database 54. The loan database 52 includes data about the loans as well as other data needed and beneficial to detecting possible Rep violations. For example, the loan database 52 can store payment performance data for the loans to be reviewed by the system 50. For example, the loan database may include one or more tables listing loans in the pools and corresponding attributes for each of the loans. The attributes may be loan-related data attributes such as: loan number; borrower ID; principal amount; interest rate; loan date; geography; loan term; remaining balance; the borrower's credit score at the time of the loan; initial appraised value of the collateral for the loans (e.g., auto or real estate); current appraised value for the collateral; zip code for registered location for the collateral; ID for the appraiser of the collateral; flags for various documents used (and signed) at closing; verification of borrower's employment and income; data about loan payments by the borrower over the course of the loan; ID for loan servicer; whether the loan is in default; and hundreds of other relevant data fields. The loan database 52 may also store data about the operational practices of the trust, such as from news reports, judicial or regulatory proceedings, and remittance or other reports for the issued securities. The loan data may be gathered periodically (such as monthly) or as available from all available sources, including the loan servicers 60, the trustee, the loan owners 10, the securities administrator, the trustee, new sources, search engines, etc. As a simple example, whenever a borrower makes a monthly loan payment on a particular loan, the data for that particular loan in the database can be updated to show the payment, its timing, its amount and its source. Similarly, the database 52 can be updated to indicate when a borrower misses a periodic loan payment and/or defaults on the loan.

Other data providers 61 may also provide data (for storing in tables of the loan database 52) pertinent to the loans that are reviewed by the system 50, as described above. This other data may include additional data about the borrowers or the collateral, for example. Such other data may be gathered from publicly available information. For example, this other data could be data gathered from internet search engines about the borrower, the collateral, and other related debts, or may by gathered by research firms that specialize in gathering such data. The other data sources 61 can include the reports for the issued securities (e.g., remittance reports) and/or news data items about the relevant parties. The data from the various sources may be integrated into one database or table, or into a federated database or table. Also, it is possible that the database 52 could have access to more than one loan per borrower, such as a car loan, credit card loan, mortgages, etc., or a secondary or third level debt obligation. In such cases, the database 52 can link the borrower's separate loans to generate a fuller picture of the borrower's circumstances.

A computer-implemented loan review engine 56 periodically (e.g., monthly) reviews the data in the loan database 52 to identify (or detect) the loans or operational practices that may have a related feature that violate one or more Reps by the securitization trust 16 or that merit further monitoring for violation of a Rep. Because there can be hundreds or thousands of loans in a securitization pool, and because the system 50 can review the loans in multiple pools, there can be hundreds of thousands or millions of loans for the loan review engine 56 to review every period (e.g., every month). As such, computer implementation is imperative.

The loan review engine 56 may identify loans that show patterns that may flag possible operational flaws associated with that loan (i.e., loans that may have operational activities that breach a rep or warranty of the securitization trust 16)

using a list of filters stored in the detection filter database 54. To the extent possible, there may be at least one filter for each Rep, and the filters may be simple or include a combination of filters (e.g., a complex filter). A simple filter may look for whether the borrower furnished documentation of their income or if the bank stopped automatically moving money from the borrower's checking account to make periodic loan payments. Complex filters may look at combinations of data attributes and/or may have more complex logic, such as, for example, to discover differences in laws or lending practices between jurisdictions. When a loan or practice has the attributes of the filter, the loan review engine 56 can flag it, assign a follow-on action score to the loan or practice associated with the filter, and report it if necessary for the follow-up action.

The list of filters in the detection filter database 54 may include a core filter list generated, for example, from institutional knowledge about securitization trust Reps that have been found to have been breached that resulted in recovered dollars and/or a review of investor public lawsuits that allege a breach of specific Reps. Different loan types (e.g., auto, equipment, student loans, residential or commercial mortgages) in different jurisdictions may have different core filters (and different numbers of filters) particular to their loan type, including different origination and servicing filters for each loan type for a jurisdiction. For example, the filters can be designed to detect:

Flawed lending practices (e.g., origination);
Flawed loan collection practices;
Flawed reporting practices;
Flawed trust administration practices; and
Other items that may violate representations and warranties disclosed in the securitization trust documents.

Additionally, the filters can be designed to detect flawed or failed curing ("flawed cures") of prior remediation demands. As a simple example, if data show that a particular party (e.g., a lender, a servicer, etc.) failed to a cure a significant amount of prior remediation demands for Rep violations that warranted remediation, a filter could be set up to flag that party. More complex flawed cure filters could also be established.

Also, new core filters may be added to the database 54 over time when relevant laws, regulatory rulings or industry practices change (e.g., if a new loan data attribute has to be tracked going forward because of a new law or new industry practice, filters related to that new loan data attribute can be added). Also, there could be trust-specific filters. For example, a particular securitization trust, familiar with issues in the loans in its pool or its operational practices unique to the trust, may specify new filters specific to its loan pool or practices that should be applied. Further, new filters can be added over time to the filter database 52 by researchers that specialize in understanding developing rep and warranty compliance items away from a specific trust. Such researcher-developed filters after appropriate coding, could be downloaded to the database 52 from a master library as needed or from time to time. However they are developed and generated, these filters are coded and stored in the filter database 54 so that the loan review engine 56 can apply them in the future. Of note, for one detection script item a loan risk code and or action code may migrate lower over the passage of time as the loan has a consistent payment pattern and if a lending manufacturing concern erodes.

An example of a core origination-type filter is that a securitization trust may warrant that all its borrowers had a certain minimum credit score and/or a certain minimum income at the time of the loan origination. Over time, it is expected that data may become available in the future that is inconsistent with the score identified in the database. As such, the filter database 54 may have filters to search different data sets that identify loans that do not meet these criteria (e.g., the borrower credit score or income is less than specified minimum thresholds) so that the loan review engine 56 can identify the loans in the pool that fail these criteria. After every periodic review, the loan review engine 56 may send electronic notification to one or more loan reviewing parties 62 that can review the loans identified by the system 50 according to, for example, specific, agreed-to, standardized testing protocols for that filter type to determine if a remedy is warranted. In particular, the follow-up action score assigned by the loan review engine 56 can further specify what testing should be applied, if the user wishes. The remedy could take many forms. For example, it could be a "putback" of the loan by the trust 16 to the loan owner 10 or financial damages compensation paid from the loan owner 10 to the trust 16. More details about such loan reviewing parties 62 are described in U.S. provisional patent application Ser. No. 14/530,110, filed Oct. 31, 2014, entitled "Converting Representation and Warranty Obligations Related to Lending and Collections Practices into Commoditized Instruments that Can be Further Used to Quantity, Manage and/or Transfer Such Representation and Warranty Risk," which is incorporated herein in its entirety. This incorporated application describes how the loan reviewing parties 62 may comprise computer systems that automatically review loans based on an electronic library of testing protocols.

Because the Reps are likely to be different for different securitization trusts, the detection filter database 54 may also include a table to specify which filters are used for which loan pools. That way, for a particular loan pool, the loan review engine 56 only applies the filters associated with or specified for that loan pool. Also, the follow-on prioritization action score for the filters could be different for different trusts. Of course, some filters may be common to multiple loan pools.

As shown in FIG. 2, the system 50 may also include a computer-implemented filter-learning engine 58 that can develop new filters to be applied on an ongoing basis using machine-learning techniques for example. For example, the filter-learning engine 58 can identify common attributes or combinations of features of loans in the loan database 52 that likely constitute a violated Rep. Those attributes or combinations of attributes can be added to the database 54 and used as new filters on an ongoing basis. For example, the filter-learning engine 58 may identify that loans entered into in a certain time period, in a certain geographic area (e.g., zip code), with a certain loan originator, appraiser, or officer, are highly likely to constitute a breach of a certain Rep. That combination of time period-geographic area-originating loan officer can then be used in a new filter applied by the loan review engine 56 to identify potentially problematic operating practices associated with certain loans (that are in a pool that has the violated Rep). The filter-learning engine 58 may use one or more suitable machine learning techniques to generate the new filters, such as decision tree learning, association rule learning, artificial neural networks, inductive logic programming and clustering, for example.

The filters applied by the loan review engine 56 may have criteria that, when met, indicates the loan might need review or monitoring. It can also mean the opposite, where the lack of a finding could trigger a positive benefit elsewhere. The filter criteria could relate a single data attribute of the loan or operational process, a combination of data attributes, and/or a data pattern. Example filter criteria could be:

Independent Data Fields
  Known fraudulent appraiser (e.g., detected by reviewing all appraisal numbers)
  Known zip code where loan origination fraud is known to be common
  Known property address where a foreclosure has occurred previously
  Known borrower who has had a bankruptcy
  Known originator suspected of fraudulent lending or financing practices.
  Custodian reports that a loan file is missing critical legal documents
  Servicer reports that it cannot find the borrower
  Securities administrator reports that the rep writer will not settle a previous putback initiative
  Servicer is subject to governmental sanctions related to origination/collecting practices
  Judicial findings that a specific loan was originated in violation of law
  Rating agency downgrade of the originator, servicer, trustee, custodian, or securities administrator Concerning Data Patterns
  Borrower stops paying in the first $N_1$ (e.g., 4) months of a loan's life with the first month being a grace period (e.g., detected by looking for 30 day delinquent loans)
  Borrower goes $N_2$ (e.g., 60) days delinquent multiple times more than one time in the first $N_3$ (e.g., 18) months of the loan's life.
  Servicing is transferred and new servicer modifies a loan within $N_4$ (e.g., 6) months and gets reimbursement for prior advances greater than \$$N_5$ (e.g., \$1000).

By applying the filters programmatically, the system 50 (and the loan review engine 56) ensures that they are applied according to a consistent protocol. Where there is a mapping between the filters and follow-up prioritization action scores, there will also be a consistent, standard protocol for scoring the loans for analysis.

As mentioned above, publically available lawsuits that list securitization trust investor complaints related to securitization trust rep and warranty malfeasance can be a source for developing the core filters. This is a great source for building a master data set of known flaws to act as control patterns (complaints) for current market matters. Also, there are numerous public and private data sources that can be searched periodically (e.g., on a daily basis) going forward and the relevant items from those searches can be added as filters to help identify developing issues. For example, the data items could include borrower credit scores, borrower bankruptcy filings, operator bankruptcy filings, rating agency ratings changes, and municipal bankruptcy filings (growing tax obligations), just to name a few. Private information data sources should be secured.

Accordingly, in various embodiments, the detection filter database 54 can include a master library of coded detection filters (or scripts) based on: expert experience or institutional knowledge; investor lawsuits; government action (e.g., changes in law or regulations), changes in industry practice (gathered from publications or trade associate releases, for example), etc. Importantly, new filters can be added over time based on additional user experience, the machine learning techniques described herein, lessons learned from new investor lawsuits and regulatory rulings, suggestions from investors, public information (e.g., from search engines), etc.

Figure 3:
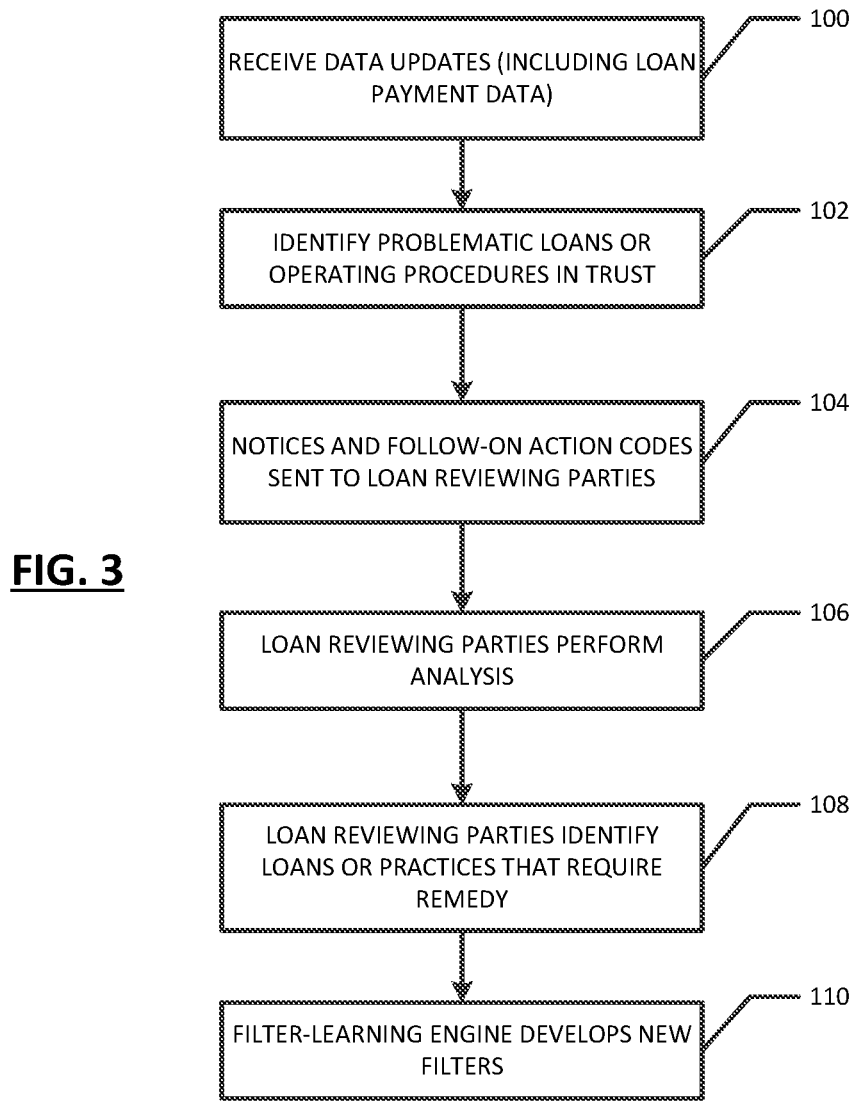
FIGS. 3 and 4 are flow charts of processes performed by the loan-filtering computer system according to various embodiments of the present invention.

FIG. 3 is a flow chart illustrating an example process flow that can be performed with the system 50 according to various embodiments of the present invention. At step 100, the system 50 receives the updated data about the loans, etc., such as from the loan servicers 60 and/or other data providers. At step 102, the loan review engine 56 applies the filters in the filter database 54 to the loans in the database 52 to identify potentially problematic loans in the pools (i.e., the loans that meet the criteria for a filter) and problematic practices, etc. The loan review engine 56 can also assign the follow-on action scores to the loans/practices associated with the filters at this step. At step 104, the loan review engine 56 can send electronic notifications of the potentially problematic loans/practices to the reviewing parties 62 so that, at step 106, the reviewing parties can perform their analysis of the loans/practices to determine if there is a breach of a Rep and, if so, to determine whether a remedy is warranted for the loans/practices identifies at step 102. The electronic notification can include the determined follow-on action score as well, so that the reviewing parties 62 know what actions it must take. At step 108 the reviewing parties 62 identify the loans/practices that constitute a breach (and/or a remedy). At step 110, the filter-learning engine 58 can use the data about the loans/practices that constitute a breach, as determined by the reviewing party(ies) 62 at step 108, to develop new filters to be applied by the loan review engine 56, as described above.

As mentioned above, the loan review engine 56 can also indicate an action (or actions) that should be taken with respect to loan quality and operational quality, and issue reports that offer possible solutions to satisfy one or more filters. In one embodiment, the loan review engine 56 can assign a pass or fail grade to each loan quality or operational quality item in the pool(s) in the periodic review. In that instance, the invention will provide a pass grade if none of the filtering criteria are met and a fail grade if the filtering criteria for one or more filters are met. In more sophisticated arrangements, the loan review engine 56 can score each loan in the pool(s), where the score is indicative of actions that should or might be taken with respect to the identified loans. For example, a low score may indicate little (or no) concern and that no action is needed, whereas a high score may indicates heightened concern, but a lack of analysis staff may assign it to a lower category so more critical items can be reviewed. In such an embodiment, a high score may result when a loan fails several filters (i.e., the criteria for several filters are met) and/or if the loan meets the criteria for a specific filter that is highly correlated to a loan with a breached rep or warranty. Also, the action scores may indicate actions that need or should be taken by the loan reviewing parties 62 or the trust 16, for example. As one example, the loan review engine 56 could action score loans for potential follow-on action on a scale of 1 to 5 where:

1 indicates a "moderately clean" loan with small infractions identified and no follow on action is needed.
2 indicates a low level of concern where follow up action may include discussions with the appropriate party(ies) (e.g., the loan servicers 60, the loan reviewing parties 62, the trust 16) to determine if the concern is growing.
3 indicates a high level of concern and the reviewer should manually monitor this loan or operational practice for possible future analysis, in addition to the periodic systematic review.
4 indicates that the trust (or its designated party) may have a duty to investigate because the loan meets the filter criteria commonly found in investor complaints on this type of loan or the met the filter criteria for a specially-developed filter based on past performance for similar types of loans.

5 indicates that the trust (or its designated party) may have a duty to investigate because there has been a judicial finding or settlement that suggests that the filter type has typically resulted in damages due to a Rep breach in the past.

Of course, in other embodiments, different action scoring scales can be used, and the different scores can map to different suggested follow-on actions. In general, investors/lenders typically want to know that someone will actually follow up and pursue a remedy project on a suspected item. Also, where a particular loan fails several filters, each associated with different follow-on actions, that loan could receive multiple scores, or just the highest score, for example. In practice, only loans with a threshold score or above (e.g., a score of 3 or greater in the above example) are reported to the loan reviewing parties 62 at step 104 of FIG. 3.

Figure 4:
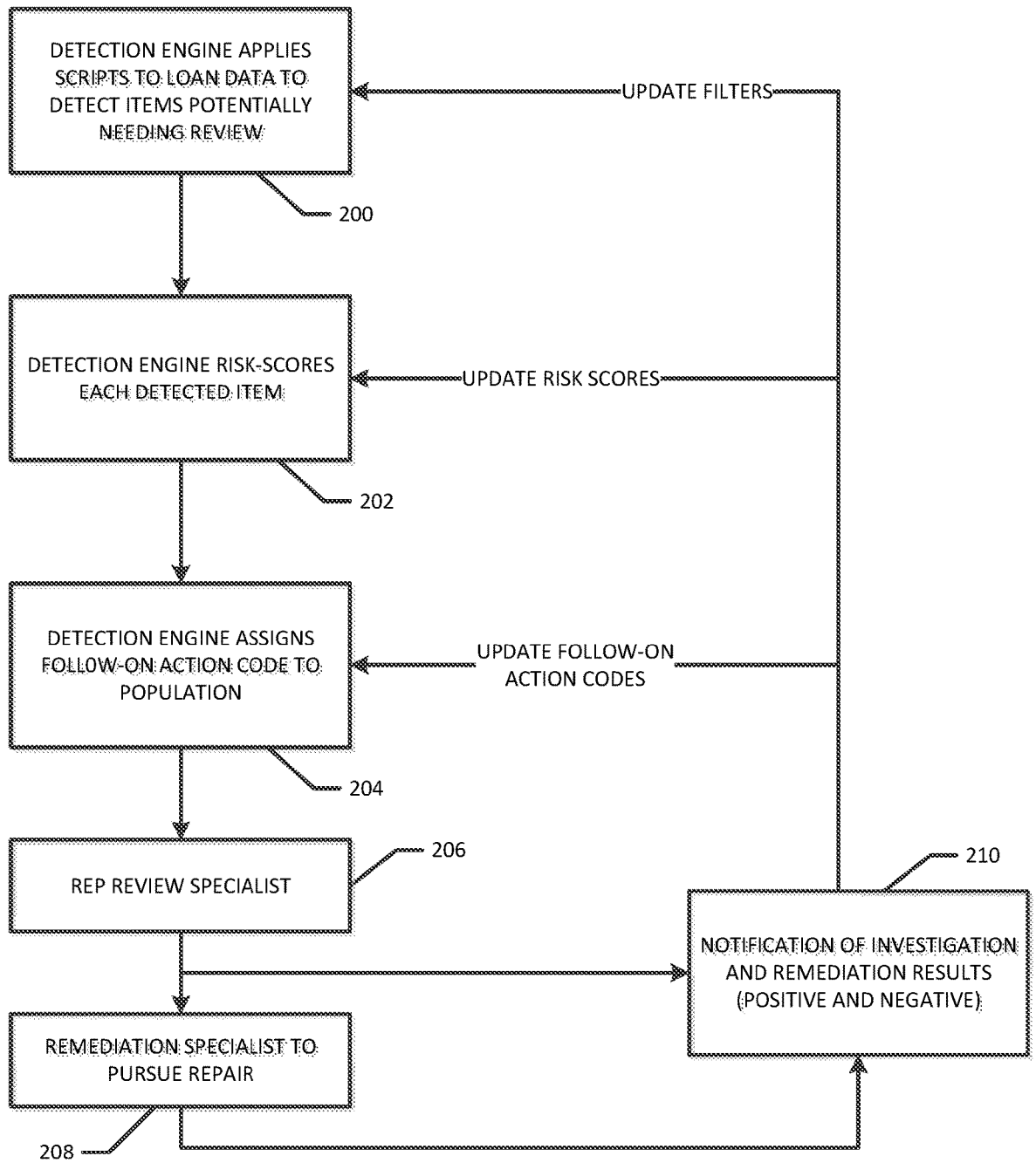

As such, FIG. 4 is another diagram that illustrates a process flow for the advocate system 50 according to various embodiments of the present invention. As described above, at step 200, the loan review (or "detection") engine 56 could apply its filter scripts to the loan data in the loan database 52 (typically periodically) to identify loan-related items (e.g., loans or operational practices) that fail the script criteria and potentially need further review. Then, at step 202, the detection engine 56 can apply a numerical risk score to each failed item. Lower number risk scores can indicate relatively low risk and, conversely, high number risk scores can indicate relatively high risk. The assigned risk scores can be based on the filter script that was failed. As mentioned above, each filter script can have a corresponding risk score, which could change over time as described herein. Then, at step 204, the detection engine 56 can apply a follow-on action code to the population of loans and other loan-related items that failed a script at step 200. The follow-on action scores can be determined based on the type of filter script that failed (step 200) and the risk score (202). At step 206, sufficiently important detected items (e.g., ones with a sufficiently high follow-on action code) are assigned to a Rep review specialist to review whether the Rep implicated by the detection filter is violated. For items where the Rep is violated and remediation may be needed, the rep review specialist can forward the item to a remediation specialist to pursue appropriate repairs and remediation if warranted at step 208. The Rep review and remediation specialists may then transmit notification of their investigations and remediation determinations to the system 50 at step 210. The notifications preferably include both positive and negative results. For example, negative results could include detected items that did not constitute a Rep violation and/or a remediation, and positive results conversely could include detected items that constitute a Rep violation and/or a remediation.

Based on that feedback, the filter scripts (step 200), the risk scores (step 202), and/or the follow-on action codes (step 204) of the advocate system 50 can update as needed to more appropriately match the evolving conditions. For example, if a failed item that previously had a high risk score and/or high priority follow-on actions turned out to be not so risky or limited in its value creation, as determined by the specialists at steps 206 and/or step, the associated risk score and/or follow-on action code for that failed item could be reduced for future applications. Conversely, if a failed item that previously had a high low score and/or low priority follow-on actions turned out to be more risky than originally understood, the risk score and/or follow-on action code for that failed item could be increased. For instance, a loan that stops paying soon after the loan was originated may be flagged as a high risk loan, but the investigation (step 206) may identify that they borrower simply lost his job unexpectedly. In that instance, the detection/risk scores will likely be left unchanged because the cause of the poor payment pattern was unique to that borrower. Alternatively, in the instance of a loan that stops paying soon after origination, it may be learned that the borrower was defrauded by a specific loan broker. In response, that originator and broker identification number may be used as a revised filter item and the risk score applicable to that data item may be increased due to the high value nature of that loan type. Also, the filter scripts (step 200), the risk scores (step 202), and/or the follow-on action codes (step 204) could be updated based on evolving market conditions in the relevant lending market. For instance, a rising rate environment could increase the risk of payment shock for borrowers. Larger shocks could generate higher risk codes and in turn investigations. Of note, these investigations could be a preventative measure before the actual jump in payment obligations.

As described above, the loan data that the detection engine 56 reviews may be for one or multiple loan pools. If multiple loan pools are examined, the feedback mechanism will be more robust because there will be more feedback data. Similarly, if multiple loan pools are examined, the advocate system 50 can be scaled to match the loan reviewing requirements. For example, the advocate system 50 may include one or a number of suitable computing devices. For relatively small uses (e.g., one or small number of small loan pools), the engines 56, 58 could be implemented with a single server or mainframe, etc. But more likely, in installations where the advocate system 50 is processing a large number of loans and loan pools, it may include numerous, internetworked servers and/or mainframes, etc. Also, the numerous servers comprising the advocate system 50 may be co-located in one data centers or they could be geographically distributed across two or more data centers, with appropriate network connections between the various geographically distributed data centers.

The engines 56, 58 described herein may be implemented as computer devices (e.g., servers) that execute software and/or firmware code. As such, the engines 56, 58 may servers or other types of suitable computing devices that include one or more processors or other programmable circuits to execute the software and firmware code. The software may use any suitable computer software language type, using, for example, conventional or object-oriented techniques. Such software may be stored on any type of suitable computer-readable medium or media of the computing devices, such as, for example, primary or secondary computer memory. The primary memory can include main memory (such as RAM and ROM), processor registers and processor cache. The secondary memory can include magnetic or optical storage systems, or flash memory, for example. The memory is in communication with the engines' processor(s), which execute software stored in the memory to perform the functions described herein.

The various databases described herein (e.g., databases 52, 54) may be implemented may be embodied as solid state memory (e.g., ROM), hard disk drive systems, RAID, disk arrays, storage area networks (SANs), in-memory database systems, and/or any other suitable system for storing computer data. In addition, the databases may comprise caches, including web caches and database caches. The databases may also comprise database management systems (DBMSs) that control access to the databases, such as MySQL, PostgreSQL, Microsoft SQL Server, Oracle, Sybase or IBM DB2 database management systems, for example. The databases may be part of the computer device(s) for the engines 56, 58 or connected to the computer device(s) via a network connection. In that connection, the computer system 50 may communicate with other computer systems, such as computer systems for the loan servicers, the loan reviewing parties, researchers that develop new filters, etc., via electronic data communication networks. The networks may comprise one or more LANs, WANs, the Internet, and/or an extranet, or any other suitable data communication network allowing communication between computer systems. The networks may comprise wired and/or wireless links. The data feeds from the data sources 10, 60, 61, 62, etc. to and from the advocate system 50 may use point-to-point data feeds and/or web feeds.

In one general aspect, therefore, the present invention is directed to a computer system that monitors representation and warranty (collectively, "Rep") compliance on an ongoing basis for one or more loan pools that are each subject to a plurality of Reps. The computer system comprises (i) a loan database that stores loan data about loans in the one or more loan pools; (ii) a detection filter database that stores data for filter scripts to be applied to the loan data pool data base to detect loan-related items that potentially violate a Rep; and (iii) a loan review engine in communication with the loan database. The loan review engine comprises one or more computer devices, each comprising one or more processors and computer memory. The computer memory stores software that, when executed by the one or more processors, cause the one or more processors to apply filter scripts in the detection filter database to loan data in the loan database to detect loan-related items that fail the filter script, indicating a potential violation of one of the Reps; assign each detected loan-related item a risk score based on at least the filter script and other learned items that was failed; assign each detected loan-related item a follow-on action code based on, at least, the filter script that was failed and the assigned risk score; and transmit electronically data about each detected loan-related item to one or more loan reviewing parties via a computer data network so that the one or more loan reviewing parties review the detected loan-related items to determine whether a Rep was violated.

In various implementations, the loan review engine reviews loans from a plurality of loan pools and the loan database stores data about loans in each of the plurality of loan pools. Also, the loan database may stores data, for each loan, that indicates the loan pool to which the loan belongs. There may be at least one filter script for each Rep that is applied by the loan review engine. And the loans may be auto loans, credit card obligations, equipment loans, student loans, residential mortgages, or commercial mortgages, for example.

In various implementations, the Reps relate to: origination of assets underlying the loans in the loan pools; ongoing loan servicing of the assets underlying the loans in the loan pools; and operational practices of a trust that provided the Reps. The filter scripts that are applied to the loan data may be designed to detect at least one of: flawed loan origination practices; flawed ongoing loan payment collection practices; flawed ongoing reporting practices; flawed cures of prior remediation demands; and flawed ongoing trust administration practices.

In various implementations, the system further comprises a filter learning engine that is implemented with one or more computer devices that identify new filter scripts, based on feedback from the loan reviewing parties, with the new filter scripts being stored in the detection filter database and applied by the loan review engine.

In another general aspect, the present invention is directed to a computer-implemented method system that monitors Rep compliance on an ongoing basis for one or more loan pools that are each subject to a plurality of Reps. The method comprises the steps of storing, in a loan database, loan data about loans in the one or more loan pools and storing, in a detection filter database, data for filter scripts to be applied to the loan data to detect loan-related items that potentially violate a Rep. The method further comprises the step of applying, by a programmable, computer-implemented loan review engine, filter scripts in the detection filter database to loan data in the loan database to detect loan-related items that fail the filter script, indicating a potential violation of one of the Reps. The method further comprises the step of assigning, by the loan review engine, each detected loan-related item a risk score based on the filter script that was failed. The method further comprises the step of assigning, by the loan review engine, each detected loan-related item a follow-on action code based on, at least, the filter script that was failed and the assigned risk score. The method further comprises the step of transmitting electronically, by the loan review engine, data about each detected loan-related item to one or more loan reviewing parties via a computer data network so that the one or more loan reviewing parties review the detected loan-related items to determine whether a Rep was violated.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm," cloud computing environment, or other grouping of networked servers (such as server blades) that are located and configured for cooperative functions It can be appreciated that a server farm or cloud computing environment may serve to distribute workload between/among individual components of the farm or cloud, as the case may be, and may expedite computing processes by harnessing the collective and cooperative power of multiple servers. Such server farms or clouds may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid-state transistors of the processor(s) and/or memory circuit(s), may change during operation of the circuits.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system that monitors representation and warranty (collectively, "Rep") compliance on an ongoing basis for a loan pool that is subject to a plurality of Reps, wherein the loan pool comprises a plurality of post-origination loans, the plurality of Reps are provided by a trust that issues securities backed by the plurality loans in the loan pool, and each of the plurality of Reps applies to the loan pool, the computer system comprising:
   a loan database that stores loan data about loans in the loan pool;
   a detection filter database that stores data for filter scripts to be applied to the loan data to detect loan-related items that potentially violate a Rep of the loan pool, wherein the plurality of Reps comprise Reps related to:
   origination of assets underlying the loans in the loan pool;
   ongoing loan servicing of the assets underlying the loans in the loan pool; and
   operational practices of the trust that provided the Reps;
   a loan review engine in communication with the loan database and the detection filter database, wherein the loan review engine comprises one or more computer devices, each comprising one or more processors and computer memory, wherein the computer memory stores software that, when executed by the one or more processors, cause the one or more processors to:
   apply filter scripts in the detection filter database to loan data in the loan database to detect loan-related items that fail the filter script, indicating a potential violation of one of the Reps;
   assign each detected loan-related item a risk score based on at least the filter script that was failed;
   assign each detected loan-related item a follow-on action code based on, at least, the filter script that was failed and the assigned risk score; and
   transmit electronically the follow-on action code for each detected loan-related item to one or more loan reviewing parties via a computer data network so that the one or more loan reviewing parties perform the assigned follow-on action code; and
   a filter learning engine that is implemented with one or more computer devices, wherein the one or more computer devices of the filter learning engine generate and identify new filter scripts using machine learning by an artificial neural network, based on attributes of loans that correlate to a likely Rep violation, wherein the new filter scripts are stored in the detection filter database and applied by the loan review engine.

2. The system of claim 1, wherein the loan review engine reviews loans from a plurality of loan pools and the loan database stores data about loans in each of the plurality of loan pools.

3. The system of claim 2, wherein the loan database stores data, for each loan, that indicates the loan pool to which the loan belongs.

4. The system of claim 1, wherein there is at least one filter script for each Rep that is applied by the loan review engine.

5. The system of claim 1, wherein the loans in the loan pool comprises loans selected from the group consisting of auto loans, credit card obligations, equipment loans, student loans, residential mortgages, and commercial mortgages.

6. The computer system of claim 1, wherein the filter scripts are applied to the loan data to detect at least one of:
   flawed loan origination practices;
   flawed ongoing loan payment collection practices;
   flawed ongoing reporting practices;
   flawed cures of prior remediation demands; and
   flawed ongoing trust administration practices.

7. A computer-implemented method that monitors Rep compliance on an ongoing basis for a loan pool that is subject to a plurality of Reps, wherein the loan pool comprises a plurality of post-origination loans, the plurality of Reps are provided by a trust that issues securities backed by the plurality loans in the loan pool, and each of the plurality of Reps applies to the loan pool, the method comprising:
   storing, in a loan database, loan data about loans in the loan pool;
   storing, in a detection filter database, data for filter scripts to be applied to the loan data to detect loan-related items that potentially violate a Rep of the loan pool, wherein the plurality of Reps comprise Reps related to:
   origination of assets underlying the loans in the loan pool;
   ongoing loan servicing of the assets underlying the loans in the loan pool; and
   operational practices of the trust that provided the Reps; and
   applying, by a programmable, computer-implemented loan review engine, filter scripts in the detection filter database to loan data in the loan database to detect loan-related items that fail the filter script, indicating a potential violation of one of the Reps;
   assigning, by the loan review engine, each detected loan-related item a risk score based on the filter script that was failed;
   assigning, by the loan review engine, each detected loan-related item a follow-on action code based on, at least, the filter script that was failed and the assigned risk score;
   transmitting electronically, by the loan review engine, the follow-on action code for each detected loan-related item to one or more loan reviewing parties via a computer data network so that the one or more loan reviewing parties perform the assigned follow-on action code; and
   generating and identifying, by a filter learning engine that is implemented with one or more computer devices, new filter scripts using machine learning by an artificial neural network, based on attributes of loans that correlate to a likely Rep violation, wherein the new filter scripts are stored in the detection filter database and applied by the loan review engine.

8. The method of claim 7, wherein the loan review engine reviews loans from a plurality of loan pools and the loan database stores data about loans in each of the plurality of loan pools.

9. The method of claim 8, wherein the loan database stores data, for each loan, that indicates the loan pool to which the loan belongs.

10. The method of claim 7, wherein there is at least one filter script for each Rep that is applied by the loan review engine.

11. The method of claim 7, wherein the loans of the loan pool comprises loans selected from the group consisting of auto loans, credit card obligations, equipment loans, student loans, residential mortgages, and commercial mortgages.

12. The method of claim 7, wherein the filter scripts are applied to the loan data to detect at least one of:
flawed loan origination practices;
flawed ongoing loan payment collection practices;
flawed ongoing reporting practices;
flawed cures of prior remediation demands; and
flawed ongoing trust administration practices.

13. A computer system that monitors representation and warranty (collectively, "Rep") compliance on an ongoing basis for a loan pool that is subject to a plurality of Reps, wherein the loan pool comprises a plurality of post-origination loans, the plurality of Reps are provided by a trust that issues securities backed by the plurality loans in the loan pool, and each of the plurality of Reps applies to the loan pool, the computer system comprising:
a loan database that stores loan data about loans in the one or more loan pools;
a detection filter database that stores data for filter scripts to be applied to the loan data to detect loan-related items that potentially violate a Rep of the loan pool, wherein the plurality of Reps comprise Reps related to:
origination of assets underlying the loans in the loan pool;
ongoing loan servicing of the assets underlying the loans in the loan pool; and
operational practices of the trust that provided the Reps; and
a computer system means, in communication with the loan database and the detection filter database, wherein the computer system is configured for:
applying filter scripts in the detection filter database to loan data in the loan database to detect loan-related items that fail the filter script, indicating a potential violation of one of the Reps;
assigning each detected loan-related item a risk score based on at least the filter script that was failed;
assigning each detected loan-related item a follow-on action code based on, at least, the filter script that was failed and the assigned risk score;
transmitting electronically the follow-on action code for each detected loan-related item to one or more loan reviewing parties via a computer data network so that the one or more loan reviewing parties perform the assigned follow-on action code; and
generating and identifying new filter scripts using machine learning by an artificial neural network, based on attributes of loans that correlate to a likely Rep violation, wherein the new filter scripts are stored in the detection filter database and applied by the computer system means.

* * * * *